United States Patent
Morita et al.

(10) Patent No.: US 10,739,132 B2
(45) Date of Patent: Aug. 11, 2020

(54) FLATNESS DETECTION METHOD, FLATNESS DETECTION DEVICE, AND FLATNESS DETECTION PROGRAM

(71) Applicant: SUMIDA CORPORATION, Chuo-Ku, Tokyo (JP)

(72) Inventors: Junji Morita, Natori (JP); Daichi Gemba, Natori (JP)

(73) Assignee: SUMIDA CORPORATION (JP)

( * ) Notice: Subject to any disclaimer, the term of this patent is extended or adjusted under 35 U.S.C. 154(b) by 0 days.

(21) Appl. No.: 16/298,543

(22) Filed: Mar. 11, 2019

(65) Prior Publication Data

US 2019/0346260 A1    Nov. 14, 2019

(30) Foreign Application Priority Data

May 11, 2018    (JP) .................................. 2018-092100

(51) Int. Cl.
 *G01B 11/30*   (2006.01)
 *G01B 11/24*   (2006.01)
 *G01B 11/03*   (2006.01)

(52) U.S. Cl.
 CPC .............. *G01B 11/30* (2013.01); *G01B 11/03* (2013.01); *G01B 11/24* (2013.01)

(58) Field of Classification Search
 CPC .............................. G01B 11/03; G01B 11/24
 See application file for complete search history.

(56) References Cited

U.S. PATENT DOCUMENTS

| | | | | |
|---|---|---|---|---|
| 6,292,530 B1* | 9/2001 | Yavus | ................... | A61B 6/025 378/22 |
| 2010/0157044 A1* | 6/2010 | Mori | ..................... | G06T 7/0004 348/92 |
| 2016/0347386 A1* | 12/2016 | Matsunami | ............ | G05D 1/024 |

FOREIGN PATENT DOCUMENTS

| | | |
|---|---|---|
| JP | H05-223533 A | 8/1993 |
| JP | 2007-225317 A | 9/2007 |

* cited by examiner

*Primary Examiner* — Edward Park
(74) *Attorney, Agent, or Firm* — Harness, Dickey & Pierce, P.L.C.

(57) ABSTRACT

A flatness detection method is provided for detecting component tilt regardless of measurement conditions. The flatness detection method is based on data of an electronic component captured by a 3D camera and is realized by acquiring position information and height information of a plurality of reference points of the electronic component, creating a virtual plane based on the position and the height information of at least three of the plurality of reference points, determining, based on the height information that takes, as a reference, the virtual plane of the reference points excluding selected points from the reference points, whether the virtual plane is a valid plane or an invalid plane, and detecting flatness of the component by taking the valid plane as a reference.

8 Claims, 8 Drawing Sheets

FLATNESS DETECTION METHOD, FLATNESS DETECTION DEVICE, AND FLATNESS DETECTION PROGRAM

BACKGROUND

Technical Field

The present invention relates to a flatness detection method, a flatness detection device, and a flatness detection program which are for detecting flatness of a component.

Related Art

In a manufacturing process of electronic components and the like, flatness of a manufactured electronic component has to be inspected. The "flatness" here is a degree of vertical rotation of an electronic component around a horizontal axis when the electronic component is placed on a horizontal surface. An electronic component for which sufficient flatness is not achieved is determined to be defective (NG) in the stage of inspection, because such an electronic component causes problems at the time of mounting performed later. In many cases, all the components are inspected at the time of inspection of electronic components, and inspection of each electronic component is desirably performed in a short time, with high accuracy. For example, inspection of electronic components satisfying such requirements is performed using a camera that three-dimensionally captures the electronic components. A device that inspects electronic components using a known camera is described in Japanese Patent Laid-Open No. 2007-225317 (hereinafter referred to as "Patent Document 1"), for example.

The device described in Patent Document 1 radiates line light from below a component. Patent Document 1 describes capturing a projected image of the line light by a camera from below a component, and obtaining flatness of a terminal or height data of a ball based on a light cutting line by the line light.

Another device that radiates laser light on an electronic component from below, and that measures a terminal height of the electronic component is described in Japanese Patent Laid-Open No. 5-223533 (hereinafter referred to as "Patent Document 2"). With a height measurement device of Patent Document 2, to measure a terminal height in a state where an electronic component is mounted, the electronic component is mounted on a glass substrate, and laser light is radiated on the electronic component from the side of the glass substrate. A part of the radiated laser light is reflected by a terminal. Patent Document 2 describes measuring a terminal height by concentrating the reflected light reflected by the terminal, on a one-dimensional sensor.

[Patent Document 1] Japanese Patent Laid-Open No. 2007-225317

[Patent Document 2] Japanese Patent Laid-Open No. 5-223533

SUMMARY

Flatness of an electronic component is detected by measuring a height at a plurality of positions of the electronic component. However, with the devices described above, the height is possibly detected in a state where the electronic component is tilted due to dust or the like entering between the electronic component and a table where the electronic component is placed. In a state where the electronic component is tilted, an accurate height cannot be measured, and reliability of product quality is reduced because whether the electronic component is a non-defective product or a defective product cannot be accurately determined. To eliminate the possibility of dust entering between the electronic component and the table, methods of frequently cleaning an inspection line, and of observing a state at a top of the table with high accuracy are conceivable, but the methods both require time, and result in lowered inspection efficiency.

As described above, with a three-dimensional measurement device described in Patent Document 2 mentioned above, an electronic component is observed through a glass substrate. Accordingly, when a radiation angle of the laser light is shifted, a refractive index for light also changes, and reliability of measurement is reduced. Moreover, impurities in the glass substrate used in measurement are possible factors that cause erroneous determination of the terminal height. Accordingly, with the three-dimensional measurement device described in Patent Document 2, there are limitations regarding a thickness, a manufacturer and the like of glass. Moreover, the three-dimensional measurement device described in Patent Document 2 requires a process of removing above-mentioned small noises caused by the glass substrate from a measurement signal (such as an averaging process), and is disadvantageous from the standpoint of device miniaturization and of increasing accuracy.

The present invention has been made in view of the above circumstances, and is related to a flatness detection method, a flatness detection device, and a flatness detection program which are capable of accurately detecting a tilt of a component regardless of measurement conditions, and of increasing inspection accuracy of a component.

A flatness detection method according to an aspect of the present invention is a flatness detection method of detecting flatness of a component based on captured data obtained by capturing the component by a capturing device, the flatness detection method including: a reference point information acquisition step of acquiring position information and height information of a plurality of reference points of the component; a virtual plane creation step of creating a virtual plane based on the position information and the height information of at least three selected points selected from the plurality of reference points; a virtual plane determination step of determining, based on the height information that takes, as a reference, the virtual plane of the reference points excluding the selected points, whether the virtual plane is a valid plane or an invalid plane; and a flatness detection step of detecting flatness of the component by taking the valid plane as a reference.

A flatness detection device according to an aspect of the present invention is a flatness detection device for detecting flatness of a component based on captured data obtained by capturing the component by a capturing device, the flatness detection device including: a reference point information acquisition unit for acquiring position information and height information of a plurality of reference points of the component; a virtual plane creation unit for creating a virtual plane based on the position information and the height information of at least three selected points selected from the plurality of reference points; a virtual plane determination unit for determining, based on the height information that takes, as a reference, the virtual plane of the reference points excluding the selected points, whether the virtual plane is a valid plane or an invalid plane; and a flatness detection unit for detecting flatness of the component by taking the valid plane as a reference.

A non-transitory computer-readable storage medium according to an aspect is a non-transitory computer-readable storage medium storing a flatness detection program for detecting flatness of a component based on captured data obtained by capturing the component by a capturing device, the flatness detection program being for causing a computer to perform: a reference point information acquisition function for acquiring position information and height information of a plurality of reference points of the component; a virtual plane creation function for creating a virtual plane based on the position information and the height information of at least three selected points selected from the plurality of reference points; a virtual plane determination function for determining, based on the height information that takes, as a reference, the virtual plane of the reference points excluding the selected points, whether the virtual plane is a valid plane or an invalid plane; and a flatness detection function for detecting flatness of the component by taking the valid plane as a reference.

According to the present invention, a flatness detection method, a flatness detection device, and a flatness detection program which are capable of accurately detecting a tilt of a component regardless of measurement conditions, and of increasing inspection accuracy of a component may be provided.

DESCRIPTION OF EXEMPLARY EMBODIMENTS

Figure 1A:
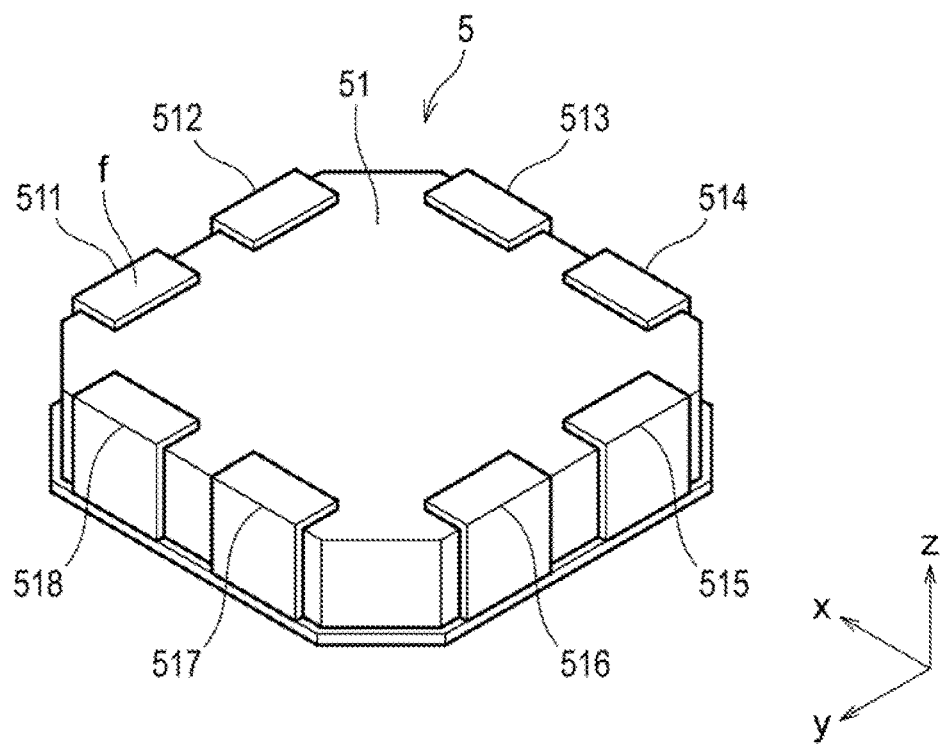
FIG. 1A is a perspective view illustrating an electronic component, flatness of which is detected by a flatness detection method and the like of a first embodiment of the present invention.

Hereinafter, a first embodiment and a second embodiment of the present invention will be described with reference to the drawings. In all the drawings, same structural elements are denoted by a same reference sign, and a redundant description will be omitted as appropriate. At least one of the drawings for the first embodiment and the second embodiment is a schematic drawing for describing a configuration, a mechanism, or operation of the present invention, and does not necessarily accurately show a dimensional shape, a length-to-width ratio, and the like. Furthermore, in the first embodiment and the second embodiment, a z direction of x, y, z coordinate axes shown in FIG. 1A is described as "up", and a −z direction, not shown, opposite the z direction along the z-axis is described as "down". However, such up-down directions are opposite up-down directions at a time of use of an electronic component mounted on a substrate.

First Embodiment (Outline)

First, before describing the first embodiment, an outline of a detection method and the like for flatness according to the first embodiment will be given. The first embodiment is applied to detection of flatness of a component. A component here is a member which is used together with another member for assembly. If such a component is distorted, or sizes or shapes of the components are varied, ease of assembly is reduced, or accuracy or quality of a finished product is reduced, and thus, inspection becomes necessary. Additionally, a component in the first embodiment is required to be used by being placed on a plane. To be placed on a plane is to have at least a part of the component come into contact with the plane, and does not require fixation on the plane. A reference point may be either of a point on a component or a point on a member that is attached to the component, and a "point, on a component, as a reference" is a point that can be detected by a capturing device, and may be a common point among a plurality of components, or may be a point different for each component.

In the first embodiment described below, an example is described where a flatness detection method, a flatness detection device, and a flatness detection program are applied to detection of flatness of an electronic component that takes a point on a terminal of the electronic component as a reference point.

Figure 1B:
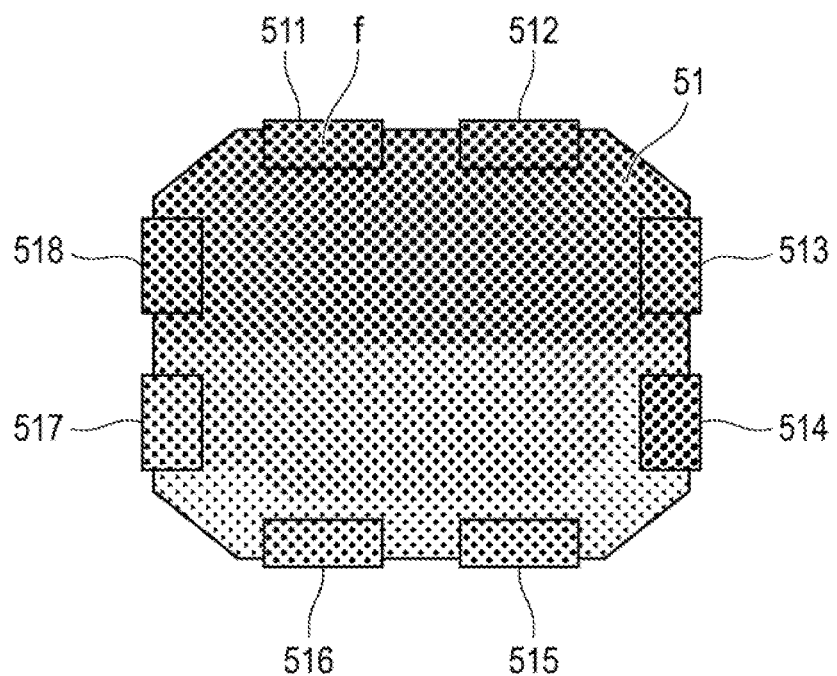
FIG. 1B is a diagram showing an image that is obtained by capturing the electronic component shown in FIG. 1A from above.

FIG. 1A is a perspective view illustrating an electronic component 5, flatness of which is detected by a flatness detection method and the like of the first embodiment. FIG. 1B is a diagram illustrating an image that is obtained by capturing the electronic component 5 shown in FIG. 1A from above.

As shown in FIG. 1A, the electronic component 5 includes a main body 51, and a plurality (eight) of terminals 511 to 518. The terminals 511, . . . , 518 of the electronic component 5 are so called SOJs (Small Outline J-leaded), which are each formed by bending a lead into a J-shape toward a side (inside) of the main body 51. With respect to each of the terminals 511, . . . , 518, a point at a predetermined position, among points on a surface (upper surface) facing the z direction, is taken as a reference point, for example.

The terminals 511, . . . , 518 are formed by pressing an alloy of iron and nickel, for example. However, the first embodiment is not limited to be applied to an electronic component including SOJ terminals, and may be applied to measurement of flatness of an electronic component including any type of terminal. For example, as another terminal, a lead frame that is used together with a hemispherical solder or a bonding wire is conceivable. A terminal is plated with gold, nickel alloy, solder or the like as appropriate according to use or accuracy.

The main body 51 of the electronic component 5 includes a semiconductor chip, not shown, and a sealing material for sealing and holding the semiconductor chip. The semiconductor chip is an electronic component on which logic circuits such as a central processing unit (CPU) and a memory device are collectively mounted. As the sealing material, a thermally curable liquid resin material is used, for example. An epoxy resin is used as the resin material, and a silica filler is used as a filler, for example. However, the sealing material is not limited to such materials, and an appropriate material is selected from the standpoint of high adhesiveness to the semiconductor chip or a terminal material, low ionic impurity, low-stress properties, high heat-resistance, ease of shaping, and the like.

An image shown in FIG. 1B is an image that is captured by a camera, indicated in FIG. 2, that is capable of capturing a three-dimensional image (hereinafter referred to as "3D camera"). The 3D camera measures a shortest distance (distance h) from an imaging sensor to an upper surface of the main body 51, for example. The image is shown by different colors according to measured heights. In FIG. 1B, different colors are expressed by halftones at different density levels. The image is provided to a detecting person who performs flatness detection, via a display screen of a flatness detection device, for example. The detecting person may intuitively grasp approximate flatness of the electronic component 5 by looking at the image.

(Flatness Detection Device)

Figure 2:
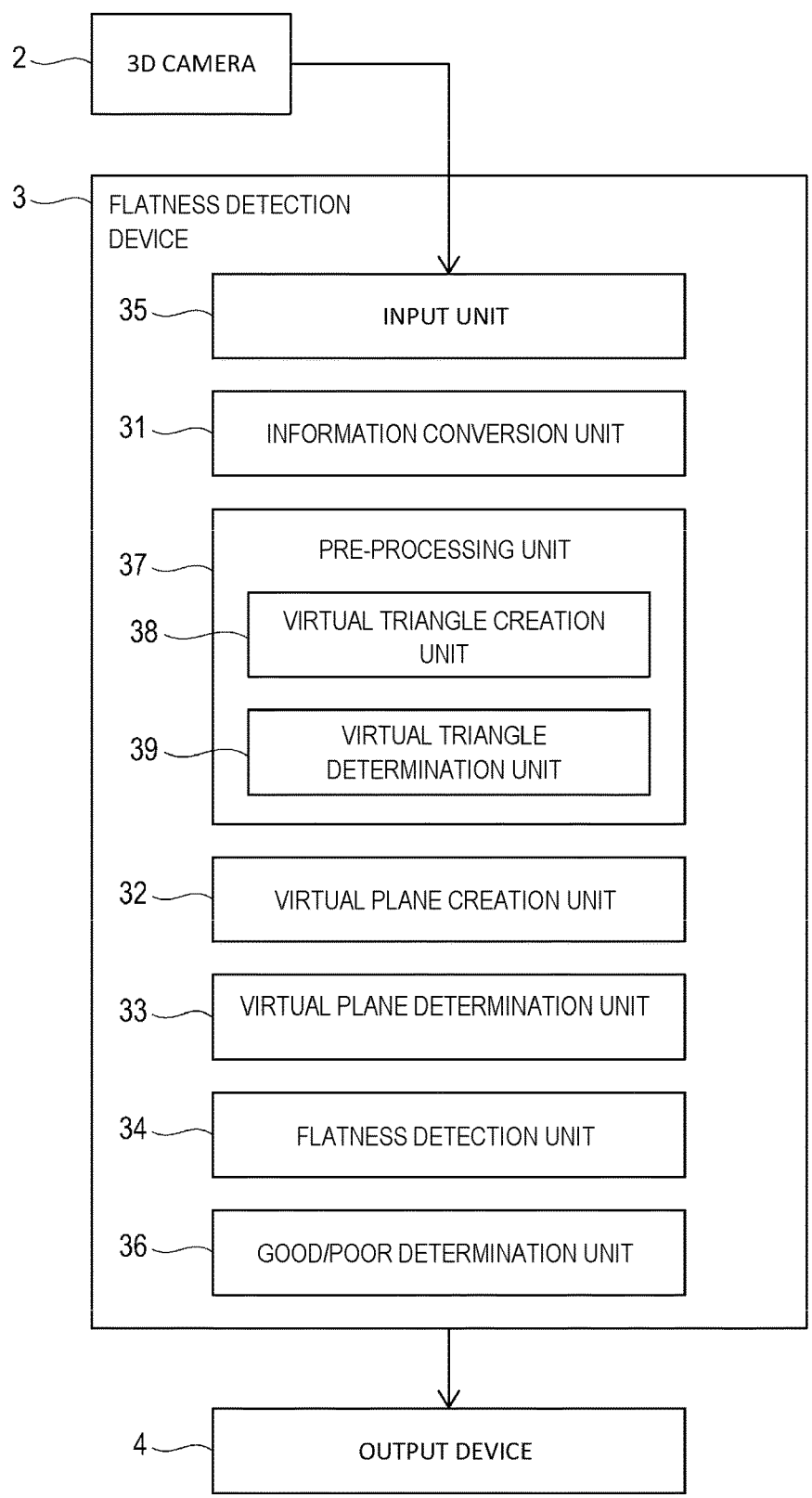
FIG. 2 is a block diagram for describing a flatness detection device of the first embodiment.

FIG. 2 is a block diagram for describing a system 1 including a flatness detection device 3 of the first embodiment. The flatness detection device 3 shown in FIG. 2 constructs the system together with a 3D camera 2 and an output device 4 for outputting information about detected flatness.

The flatness detection device 3 detects flatness of the electronic component 5 based on captured data that is obtained by capturing the electronic component 5 by the 3D camera 2, which is a capturing device. The "flatness" here is a degree of rotation of the electronic component 5 around a horizontal axis when the electronic component 5 is placed on a horizontal surface. In the case where the electronic component 5 performs such rotation with respect to the surface where the electronic component 5 is placed, the electronic component 5 may be brought into contact with a plurality of virtual surfaces with different tilts. In the first embodiment, the flatness of the electronic component 5 is detected for each of the plurality of virtual planes, and thus, the flatness of the electronic component 5 may be guaranteed for each plane.

As shown in FIG. 2, the flatness detection device 3 includes an input unit 35, at the electronic component 5, used for input, from the 3D camera 2, of a height of a reference point that is a reference for flatness detection. The reference point in the first embodiment is a point indicating a predetermined position on an upper surface of the terminal 511, . . . , 518. The predetermined position may be at an edge portion or a center point of the upper surface of the terminal 511, . . . , 518, for example, and may be a same position for the plurality of terminals 511, . . . , 518. In the first embodiment, the predetermined position may be a position different for each terminal 511, . . . , 518, such as a highest position or a lowest position of the terminal 511, . . . , 518.

In the first embodiment, the electronic component 5 includes a plurality (eight) of reference points, and the input unit 35 acquires position information and height information about positions and heights of at least three points (hereinafter referred to as "selected point(s)") selected from the plurality of reference points. The flatness detection device 3 also includes an information conversion unit 31 for converting the position information and the height information input from the input unit 35, into position information and height information to be used for calculation for flatness detection. In the first embodiment, the input unit 35 and the information conversion unit 31 function as a reference point information acquisition unit.

The flatness detection device 3 is a flatness detection device for detecting flatness of a component based on captured data obtained by capturing the component by the capturing device. The flatness detection device 3 includes the input unit 35 and the information conversion unit 31 for acquiring the position information and the height information of a plurality of reference points of the electronic component 5, a virtual plane creation unit 32 for creating a virtual plane based on the position information and the height information of at least three selected points selected from the plurality of reference points, a virtual plane determination unit 33 for determining, based on the height information that takes, as a reference, the virtual plane of the reference points excluding the selected points, whether the virtual plane is a valid plane or an invalid plane, and a flatness detection unit 34 for detecting flatness of the component by taking the valid plane as a reference. The virtual plane is a virtual plane where at least three of the terminals 511, . . . , 518 of the electronic component 5 are assumed to come into contact.

In the first embodiment, a good/poor determination unit 36 for determining good or poor of the electronic component 5 based on the flatness detected by the flatness detection unit 34 is further provided.

In the first embodiment, a pre-processing unit 37 for performing pre-processing before determination of validity or invalidity of a virtual plane is provided. The pre-processing unit 37 selects a virtual plane to be created by the virtual plane creation unit 32, based on a distance between a specified point specified by at least one of the position information or the height information, and a design point that is specified in designing of the component. The pre-processing unit 37 of the first embodiment includes a virtual triangle creation unit 38 and a virtual triangle determination unit 39, and determines whether or not the virtual plane creation unit 32 is to create a virtual plane, based on determination by the virtual triangle determination unit 39.

The pre-processing here enables selection of a virtual plane which is highly likely to be determined as an invalid plane by the virtual plane determination unit 33, without the virtual plane creation unit 32 creating a virtual plane. At least a part of a virtual plane that is determined by the pre-processing unit 37 to be created is created by the virtual plane creation unit 32. The first embodiment may thereby reduce a load related to processes by the virtual plane creation unit 32 and the virtual plane determination unit 33.

Additionally, to "create at least a part of a virtual plane" means that a virtual plane which is determined by the pre-processing unit 37 to be created is possibly not created depending on other conditions.

The flatness detection device 3 includes a CPU for controlling entire functions of the information conversion unit 31, the virtual plane creation unit 32, the virtual plane determination unit 33, the flatness detection unit 34, and the good/poor determination unit 36 described above, a hardware device such as a memory device for storing data and programs to be used for control by the CPU or for being used as a work memory of the CPU, and software for operating the hardware device. The hardware device may be dedicated to the functions of the flatness detection device 3, or may be a general-purpose personal computer.

In the case of using a general-purpose PC as the flatness detection device 3, the information conversion unit 31, the virtual plane creation unit 32, the virtual plane determination unit 33, and the flatness detection unit 34 function as a flatness detection program for causing the general-purpose PC (computer) to perform a reference point information acquisition function for acquiring position information and height information of a plurality of reference points of the component, a virtual plane creating function for creating a virtual plane based on the position information and the height information of at least three selected points selected from the plurality of reference points, a virtual plane determination function for determining, based on the height information that takes, as a reference, the virtual plane of the reference points excluding the selected points, whether the virtual plane is a valid plane or an invalid plane, and a flatness detection function for detecting flatness of the component by taking the valid plane as a reference.

In the following, each element shown in FIG. 2 described above will be described.

(3D Camera)

Figure 3:
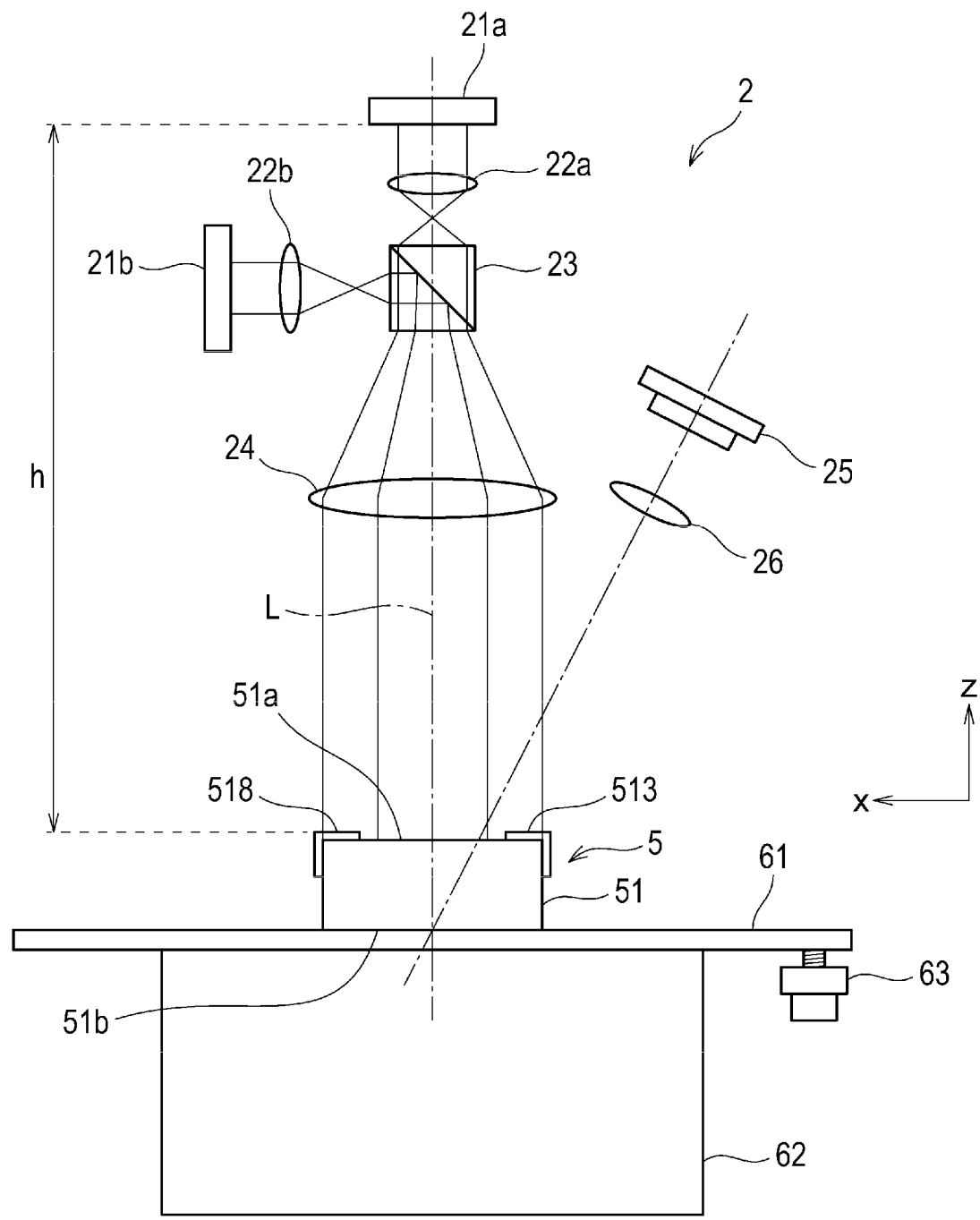
FIG. 3 is a schematic view for describing principles of measurement by a 3D camera of the first embodiment.

FIG. 3 is a schematic view for describing principles of measurement by the 3D camera 2 shown in FIG. 2. The 3D camera 2 shown in FIG. 3 captures the electronic component 5 that is placed on a table including a base 62 and a top plate 61, from above the top plate 61. The top plate 61 may be made movable in one direction, for example, and a plurality of electronic components 5 arranged in a moving direction may be sequentially captured and inspected. According to such a configuration, in the first embodiment, inspection of the electronic components 5 may be performed in a short time in an assembly line manner. A height of the top plate 61 may be changed by an elevation screw 63. Accordingly, the 3D camera 2 may focus on the reference point of the electronic component 5, regardless of the height of the electronic component 5.

The electronic component 5 is placed with a bottom surface 51b in contact with the top plate 61, and an upper surface 51a facing the 3D camera 2. The 3D camera 2 includes a light source 25 for projecting strip-shaped line light, obliquely with respect to the electronic component 5, a projection lens unit 26 for concentrating the projected line light on the upper surface 51a, a condenser lens unit 24 for concentrating the line light reflected by the upper surface 51a, and for guiding the light to a half mirror 23, CMOS sensors 21a, 21b for forming an image by the light that is led to the half mirror 23, and image forming lenses 22a, 22b for causing light to become parallel between the half mirror 23 and the CMOS sensors 21a, 21b. The 3D camera 2 includes the two CMOS sensors 21a, 21b so as to generate a low-magnification image capturing the entire electronic component 5 by one of the sensors, and to generate a high-magnification image enabling observation of a part of the electronic component 5 by the other sensor. In the first embodiment, the high-magnification image is captured on the side of the CMOS sensor 21a.

Furthermore, such a system may include two 3D cameras 2 so that the electronic component 5 may be captured from two directions so that no shadow is formed in the image.

According to the configuration described above, an image formed on the CMOS sensor 21a, 21b is output, as captured data, to the information conversion unit 31 of the flatness detection device 3 via the input unit 35. However, the 3D camera 2 of the first embodiment is not limited to the configuration of outputting image data in the above manner. For example, the 3D camera 2 may include a distance measurement unit, not shown, for determining coordinates of a reference point in the captured data, and may output position information measured by the distance measurement unit to the flatness detection device 3.

Furthermore, in the first embodiment, a distance from the 3D camera 2 to the terminal 511, . . . , 518 is measured by a TOF (Time Of Flight) method. With such a 3D camera 2, the distance measurement unit, not shown, detects, for each of a predetermined number of pixels, a time from projection of the line light from the light source 25 to the electronic component 5, to capturing (reception) of the reflected light by the CMOS sensor 21a, 21b. In the first embodiment, the 3D camera 2 projects strip-shaped line light, and a time corresponding to each beam of the line light is recorded in association with the corresponding beam of the line light.

The detected time is input to the information conversion unit 31 via the input unit 35. However, the first embodiment is not limited to the configuration of inputting a time from projection of line light to reception of reflected light, to the flatness detection device 3, and the distance measurement unit, not shown, may convert the time into a distance, and output the distance to the flatness detection device 3.

Additionally, with the TOF method, the line light may be high-speed pulse light, and a phase delay of reflected light with respect to projected light may be measured. The first embodiment is not limited to obtaining the height information by using the TOF method, and the height information may be determined by other methods such as triangulation, so long as the height is determined based on the captured data.

(Input Unit and Information Conversion Unit)

In the case of directly inputting the captured data from the 3D camera 2, the input unit 35 functions as an input interface for data. However, the first embodiment is not limited to connecting the 3D camera 2 to the flatness detection device 3 and inputting the captured data in real time. For example, the captured data generated by the 3D camera 2 may be saved in a recording medium, and be input later from the input unit 35 to the flatness detection device 3 to be processed. Furthermore, in the first embodiment, the 3D camera 2 and the flatness detection device 3 may be installed at separate locations, and the captured data generated by the 3D camera 2 may be transmitted to the flatness detection device 3 through a network line or the like. According to such a configuration, a reception device provided at the flatness detection device 3 functions as the input unit 35.

In the acquisition of the position information, the information conversion unit 31 detects an edge of the terminal 511, . . . , 518 based on the captured data, and detects a contour of the terminal 511, . . . , 518 based on the detected edge. Then, a point on the terminal 511, . . . , 518 captured in a pixel that is at a position moved by a predetermined distance and in a predetermined direction from a pixel capturing a predetermined position on the contour may be determined as the reference point. Then, the information conversion unit 31 may calculate coordinates of the reference point based on the direction and the distance of the pixel capturing the reference point with respect to the pixel capturing the predetermined position on the contour.

Moreover, the information conversion unit 31 calculates a phase difference that is caused by a time difference between projection and reception of line light that is projected on the reference point, among beams of strip-shaped line light, and calculates a distance h from the surface of the electronic component 5 to the CMOS sensor.

(Pre-Processing Unit)

The pre-processing unit 37 includes the virtual triangle creation unit 38 and the virtual triangle determination unit 39. The virtual triangle creation unit 38 selects three reference points from a plurality of reference points. Furthermore, the position information and the height information of the selected three reference points are acquired. Moreover, the virtual triangle creation unit 38 creates a triangle that takes each reference point as a vertex, and takes a centroid point of the triangle as a specified point. Furthermore, a designed centroid point of the electronic component 5 is stored, as data, in advance in the pre-processing unit 37. In the first embodiment, the centroid point that is stored as data is taken as a design point. Next, the virtual triangle determination unit 39 determines a distance between the specified point and the design point. Then, the determined distance is compared with a threshold (length) that is set in advance. The virtual triangle determination unit 39 determines validity or invalidity of the virtual triangle based on whether the distance between the specified point and the design point is within the threshold.

The virtual triangle creation unit 38 of the first embodiment selects three of the terminals 511, . . . , 518. Then, a triangle (virtual triangle) is created taking each of reference points m of the three terminals that are selected (selected terminals; for example, the terminals 511, 513, 515) as vertices. As shown in FIGS. 1A and 1B, the electronic component 5 of the first embodiment includes the eight terminals 511, . . . , 518, and thus, the virtual triangle creation unit 38 selects three reference points m that are on surfaces f of the three terminals among the eight terminals.

The virtual triangle is assumed to be a triangle that takes, as the vertices, the reference points m of the three selected terminals that are selected. Accordingly, the virtual triangle is a surface closer to the CMOS sensor 21a than the upper surface 51a (hereinafter, a term "above" will also be used).

The virtual triangle creation unit 38 creates the virtual triangle for all the combinations while changing the combination of three selected terminals. As a result, $_8C_3$ virtual triangles are created in the first embodiment.

Figure 4A:
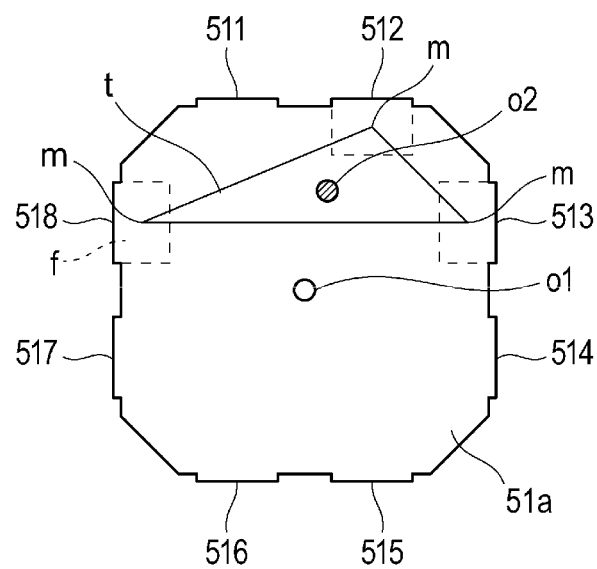
FIG. 4A is a diagram for describing process A of the first embodiment.
Figure 4B:
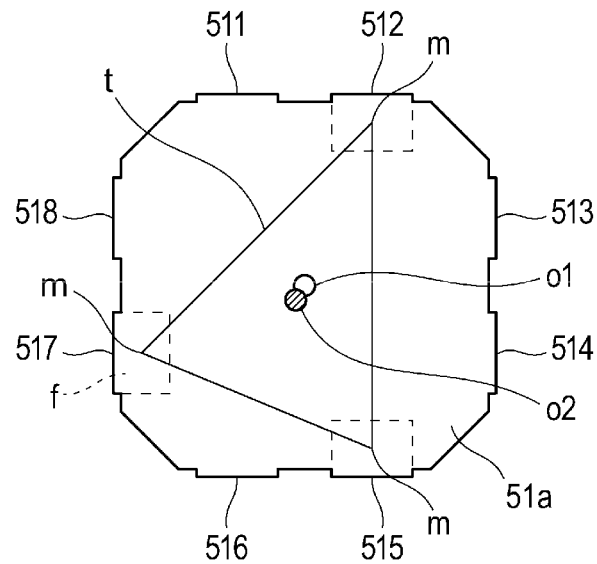
FIG. 4B is a diagram for describing process A of the first embodiment.
Figure 4C:
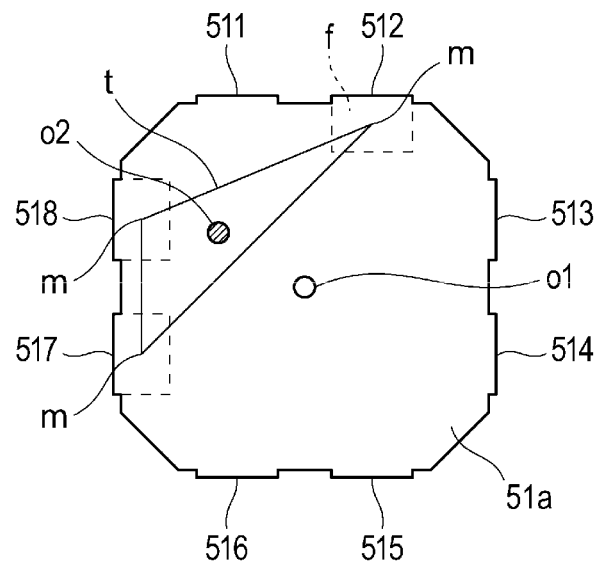
FIG. 4C is a diagram for describing process A of the first embodiment.

FIGS. 4A, 4B, and 4C are diagrams for specifically describing the pre-processing that is performed by the pre-processing unit 37. In the pre-processing, the virtual triangle determination unit 39 determines whether a virtual triangle is invalid (invalid triangle) or valid (valid triangle), based on a distance between a specified point that is specified on the electronic component 5 by the position information and the height information acquired by the input unit 35 and the information conversion unit 31, and a design point that is specified in designing of the component. In the first embodiment, the specified point of the electronic component 5 is a centroid point o2 of a virtual triangle t that takes the reference points m of the three terminals as the vertices. Moreover, the design point is a centroid point o1 of the electronic component 5. In the case where a distance between the centroid point o2 of the virtual triangle t and the centroid point o1 is at or below a threshold that is set in advance, the virtual triangle determination unit 39 determines that the virtual triangle t is a valid triangle. Additionally, in the first embodiment, when the threshold is set to 8 mm, 35 of the 56 created virtual triangles are determined to be valid triangles.

FIG. 4A shows a virtual triangle t that takes the reference points m of the terminals 512, 513, 518 as the vertices, and the centroid point o1. In the example shown in FIG. 4A, the centroid point o1 and the centroid point o2 of the virtual triangle t are separated by more than the threshold. Accordingly, the virtual triangle determination unit 39 determines the virtual triangle t that takes the reference points m of the terminals 512, 513, 518 as the vertices to be an invalid triangle. FIG. 4B shows a virtual triangle t that takes the reference points m of the terminals 512, 515, 517 as the vertices, and the centroid point o1. In the example shown in FIG. 4B, the distance between the centroid point o1 and the centroid point o2 is at or below the threshold. Accordingly, the virtual triangle determination unit 39 determines the virtual triangle t that takes the reference points m of the terminals 512, 515, 517 to be a valid triangle. FIG. 4C shows a virtual triangle t that takes the reference points m of the terminals 512, 517, 518 as the vertices, and the centroid point o1. In the example shown in FIG. 4C, the centroid point o1 and the centroid point o2 are separated by more than the threshold. Accordingly, the virtual triangle determination unit 39 determines that the virtual triangle t that takes the reference points m of the terminals 512, 517, 518 as the vertices to be an invalid triangle.

Additionally, the pre-processing is not limited to the example described above. For example, in the pre-processing, the virtual triangle t may be recognized to be a valid triangle, in a case where the centroid point o1 is included in the virtual triangle t. In the pre-processing, the design point is not limited to the centroid point o1, and the specified point is not limited to the centroid point o2, and the design point and the specified point may be any points as long as they are points enabling a tilt of the entire electronic component 5 to be effectively estimated. For example, in the first embodiment, a center point, in the designing, of the main body 51 of the electronic component 5 seen from above may be taken as the design point, and be compared with a center point of the virtual triangle t.

According to such pre-processing, in many cases, a virtual triangle that is specified by three terminals including adjacent terminals, among the terminals 511, . . . , 518, is determined to be an invalid triangle. This is because such three terminals are highly likely not able to support the electronic component 5.

With the processing described above, a virtual plane reflecting a local tilt or unevenness of the upper surface 51a may be prevented from being adopted as the valid plane.

(Virtual Plane Creation unit)

The virtual plane creation unit 32 extracts only a valid triangle based on the determination result of the virtual triangle determination unit 39. Then, a virtual plane is created based on the position information and the height information of the three reference points m which are the vertices of the valid triangle. The virtual plane is a plane that passes through the three reference points m, and creation of the virtual plane in the first embodiment is performed by creating an arithmetic expression representing such a plane, or a collection of data representing points included in the plane. In the first embodiment, 35 valid triangles are extracted by the virtual triangle determination unit 39, and thus, 35 virtual planes are created.

(Virtual Plane Determination Unit)

Next, the virtual plane determination unit 33 converts, for all the terminals 511, . . . , 518, the height information which is expressed by the distance h from the CMOS sensor 21a to the reference point m, into height information of each reference point m to the virtual plane created by the virtual plane creation unit 32. Due to this conversion, a reference height for the height information is changed from a light-receiving surface of the CMOS sensor 21a to the virtual plane. Additionally, a reference for the height information before conversion is not limited to the light-receiving surface of the CMOS sensor 21a, and may be an arbitrary point.

The virtual plane determination unit 33 determines whether a plurality of virtual planes created by the virtual plane creation unit 32 are valid planes or invalid planes. In the first embodiment, a valid plane here simulates a surface of a mounting substrate where the electronic component 5 is appropriately mounted. The valid plane is not limited to one plane, and there may be a plurality of valid planes, depending on a direction of placement of the electronic component 5, a position of a center of gravity in a placed state, and the like. An invalid plane is obtained by excluding virtual planes that are determined as the valid planes from all the virtual planes.

The virtual plane determination unit 33 calculates, from each virtual plane, the height information of the reference points m of terminals other than the three selected terminals, using the plurality of virtual planes created by the virtual plane creation unit 32 as points of reference, and analyzes the height information. As a result, if, with respect to one virtual plane, the reference point m is at a position further away from the electronic component 5 than the virtual plane, or in other words, if an arithmetic result indicating that the terminal protrudes above the virtual plane is obtained, the virtual plane determination unit 33 determines the virtual plane to be an invalid plane. The virtual plane that is determined to be an invalid plane is removed from the valid planes.

The reason for such processing is that, if the reference point m protrudes above the virtual plane, the terminal of the electronic component 5 becomes embedded in a mounting surface when mounting is performed with the terminal facing toward the mounting surface. As shown in FIG. 1A, the first embodiment is applied to the surface-mounting type terminals 511, . . . , 518, and the virtual plane is determined to be an invalid plane, assuming that the terminals 511, . . . , 518 are not supposed to be embedded in the mounting surface.

In other words, in the actual mounting, it is impossible to embed the terminal in the mounting surface, and thus, a virtual plane for which an arithmetic result indicating that the reference point m is present above is obtained is different from the actual mounting surface. To determine a mounting surface in accordance with an actual state, a virtual plane for which a result as described above is obtained is removed from the valid planes.

Additionally, in the first embodiment, a case where the height information indicates that the reference point m protrudes above the virtual plane will hereinafter also be described as the terminal corresponding to the reference point m being higher than the virtual plane. Conversely, in the first embodiment, a case where the height information indicates that the reference point m protrudes below the virtual plane will hereinafter also be described as the terminal corresponding to the reference point m being lower than the virtual plane. In the case where the terminal is lower than the virtual plane, the terminal is "floating" between the electronic component 5 and the mounting surface.

Figure 5A:
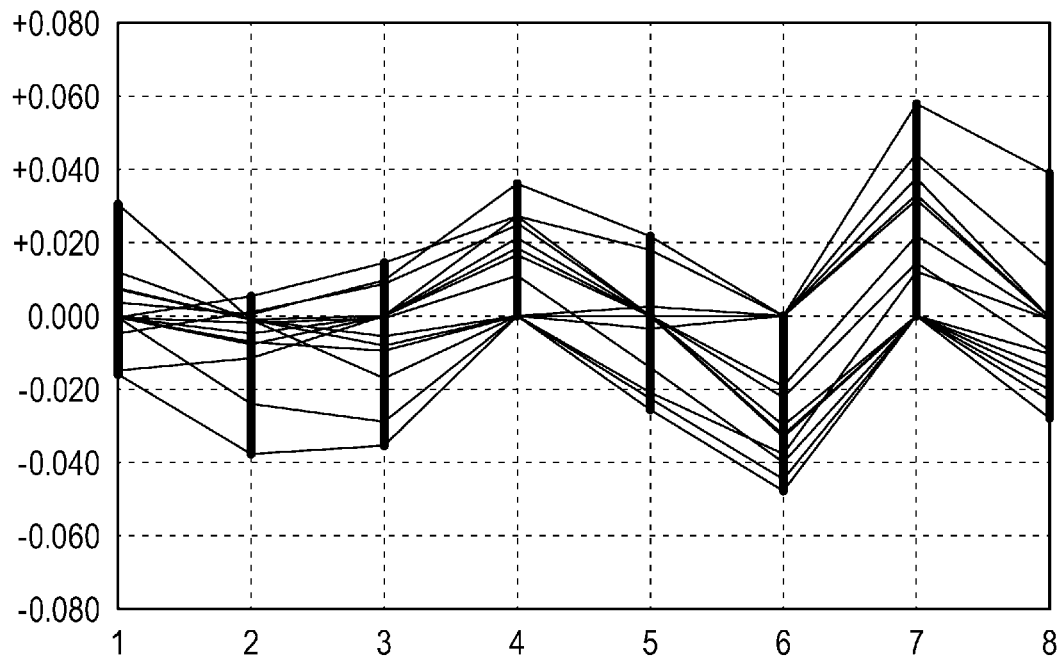
FIG. 5A is a diagram showing, with respect to virtual planes, identification numbers of terminals on a horizontal axis, and height information of each terminal on a vertical axis.
Figure 5B:
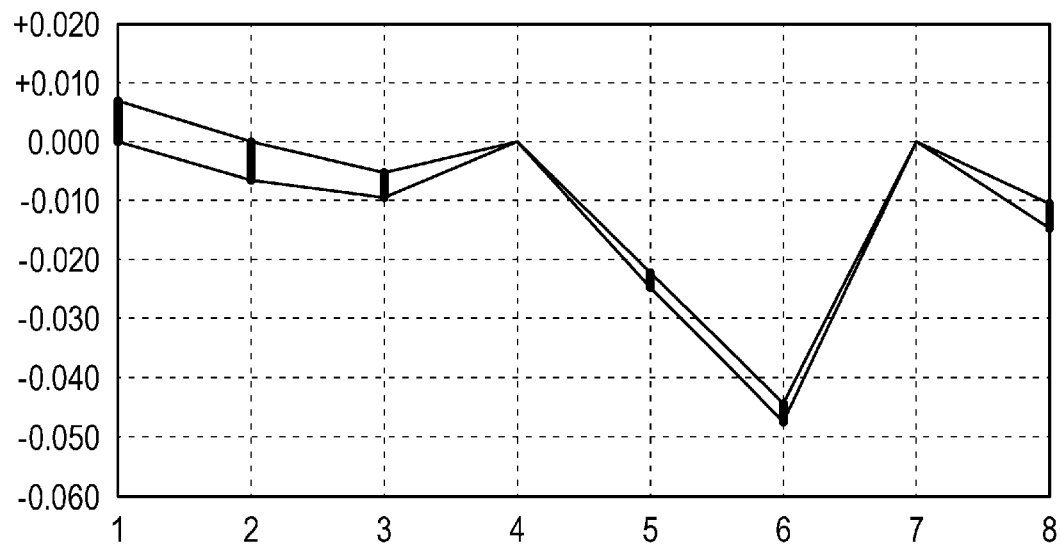
FIG. 5B is a diagram showing, with respect only to valid planes, identification numbers of terminals on a horizontal axis, and height information of each terminal on a vertical axis.

FIGS. 5A and 5B are diagrams for describing determination of a virtual plane by the virtual plane determination unit 33. FIG. 5A is a diagram showing, with respect to all the virtual planes, identification numbers (1, . . . , 8) of the terminals 511, . . . , 518 on a horizontal axis, and the height information of each terminal on a vertical axis. FIG. 5B is a diagram showing, with respect only to valid planes, identification numbers of the terminals 511, . . . , 518 on a horizontal axis, and the height information of each terminal on a vertical axis. The height information is in units of mm, and the identification number 1 corresponds to the terminal 511. In the following, the identification number matches a last digit number of the three-digit reference sign of the terminal 511, . . . , 518.

As described above, in the first embodiment, a virtual plane where a terminal that is higher than the virtual plane (in FIGS. 5A and 5B, "+" is shown on the vertical axes) exists is sorted as the invalid plane, and a virtual plane where only terminals that are on or lower than the virtual plane (in FIGS. 5A and 5B, "-" is shown on the vertical axes) exist is sorted as the valid plane. At this time, in the first embodiment, an allowable value is set as a reference for determining "higher than the virtual plane", and a virtual plane is sorted as the invalid plane in a case where the height information of the terminal is higher than the virtual plane by the allowable value or more. In the first embodiment, the allowable value is set to 0.010 mm or smaller.

(Flatness Detection Unit)

The flatness detection unit 34 calculates flatness (tilt) of the electronic component 5 based on the height of the reference point m of each terminal from a valid plane, by using only the virtual plane which is determined by the virtual plane determination unit 33 to be the valid plane. The flatness in the first embodiment is an index for "looseness" when the electronic component 5 is placed on a mounting substrate, not shown. Looseness is caused when heights of the terminals 511, . . . , 518 are varied due to a tilt of the electronic component 5, attachment angles of the terminals, or the like. Accordingly, in the first embodiment, flatness is detected by the flatness detection unit 34 detecting heights of the terminals 511, . . . , 518 by taking the valid plane as a reference. However, if the electronic component 5 is obliquely in contact with the top plate 61, the heights of the terminals cannot be accurately detected. Accordingly, in the first embodiment, the heights of the terminals are measured by taking only the valid plane as a reference, and the height of each terminal from the valid plane may be accurately detected regardless of the tilt of the electronic component 5.

The flatness detection unit 34 detects the height from the valid plane for all of the terminals 511, . . . , 518. In the first embodiment, in a detection step for the flatness, the valid plane is taken as a reference (0), and a distance from 0 to the reference point m is taken as the height of the terminal. The height from the valid plane to each reference point m indicates the flatness of the electronic component 5. That is, if, as shown in FIG. 5B, the height information of the reference point m from the valid plane is indicated for each terminal, sizes of variations in the heights of the terminals are made apparent. The flatness of the electronic component 5 may be grasped based on the sizes and trends of the variations.

Furthermore, in the first embodiment, in the case where a plurality of virtual planes are determined to be valid planes, the flatness detection unit 34 may detect the flatness with respect to each of the plurality of valid planes. Then, a maximum value and a minimum value of the terminal height may be determined among a plurality of pieces of flatness determined by taking the plurality of valid planes as points of reference, or a mean value may be determined.

(Good/Poor Determination Unit)

For example, in the case where the height of a terminal is not within a predetermined allowable range, the good/poor determination unit 36 determines that the electronic component 5 including the terminal is a defective product. In the case where the heights of all the terminals are within the allowable range, the electronic component 5 including the terminals is determined to be a non-defective product.

In the first embodiment, in the case where a plurality of valid planes are obtained, flatness may be calculated by taking, as a reference, a valid plane which is most disadvantageous for determination of the electronic component 5 as a non-defective product, among the plurality of valid planes that are obtained. A valid plane which is most disadvantageous for determination of the electronic component 5 as a non-defective product is a valid plane with respect to which a terminal height is closest to an upper limit or a lower limit of the allowable range, for example. In the first embodiment, a margin may thus be sufficiently secured for inspection of the electronic component 5, and reliability may be increased.

(Flatness Detection Method)

Figure 6:
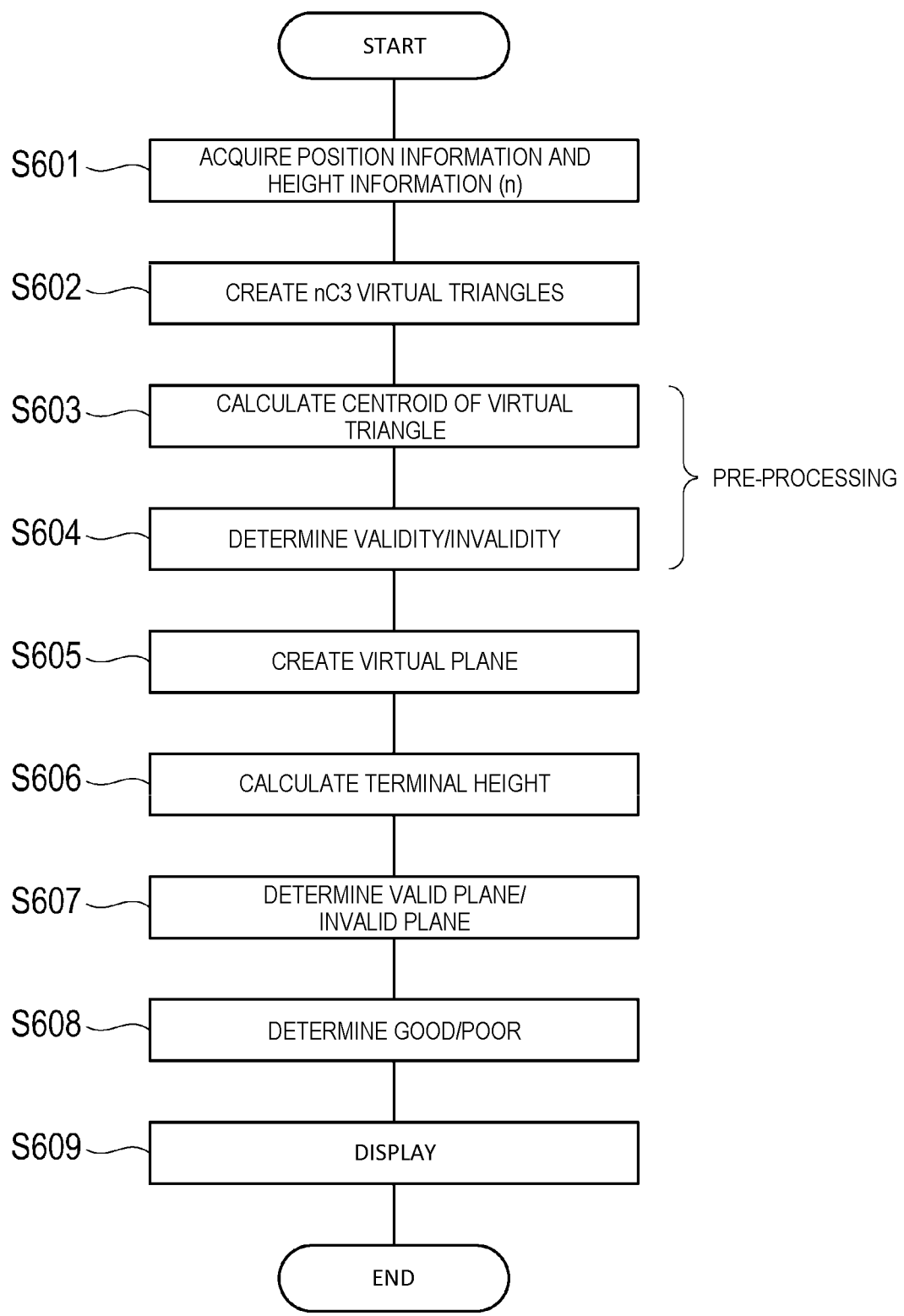
FIG. 6 is a flowchart for describing the flatness detection method of the first embodiment.

FIG. 6 is a flowchart for describing a flatness detection method that is performed by using the flatness detection device 3 described above. As shown in FIG. 6, the flatness detection method of the first embodiment is a flatness detection method of detecting flatness of the electronic component 5 based on the captured data that is obtained by capturing the electronic component 5 by the 3D camera 2. The flatness detection method includes a reference point information acquisition step (step S601) of acquiring the position information and the height information of a plurality of reference points m of the electronic component 5, a virtual plane creation step (step S605) of creating a virtual plane based on the position information and the height information of at least three selected points selected from the plurality of reference points, a virtual plane determination step (step S607) of determining, based on the height information that takes, as a reference, the virtual plane of the reference points excluding the selected points, whether the virtual plane is a valid plane or an invalid plane, and a flatness detection step (step S608) of detecting flatness of the component by taking the valid plane as a reference.

Specifically, in step S601, data about a time from projection to reception of light is input by the input unit 35, together with the captured data from the 3D camera 2. Then, the information conversion unit 31 acquires the position information of reference portions f of n terminals, or in this case, the terminals 511, . . . , 518, from the captured data, and converts the time information into the height information. The flatness detection device 3 acquires the position information and the height information for each of the terminals 511, . . . , 518. In this case, the position information and the height information of each of the n terminals may be acquired successively, but it is more desirable to simultaneously acquire the information pieces. Furthermore, nC3 pieces of virtual triangles are created based on the acquired information of the n terminals (step S602). In the present embodiment, 8C3, or in other words, 56, virtual triangles are created.

Next, in the first embodiment, the pre-processing unit 37 performs the pre-processing (steps S603, S604). Subsequently, the virtual plane creation unit 32 performs creation of the virtual plane (step S605). At this time, at least a part of a virtual plane that is created based on vertices of a virtual triangle that is determined to be a valid triangle in the pre-processing is created by the virtual plane creation unit 32. In the first embodiment, by performing the pre-processing in advance, the number of processing targets for virtual plane creation, processing for which takes a relatively long time, may be reduced, and the time taken for overall processing may be reduced.

In step S603, the virtual triangle determination unit 39 detects the centroid point o2 of a virtual triangle that takes three reference points m as the vertices, based on the position information of the reference points m. Then, in step S604, the virtual triangle determination unit 39 compares the centroid point o2 against a known centroid point o1 that is saved in the flatness detection device 3 in advance. In the case where the result of comparison indicates that the centroid point o1 and the centroid point o2 are separated by a threshold or more, the virtual plane created by the three reference points m is determined to be an invalid triangle. In the case where the distance between the centroid point o1 and the centroid point o2 is within the range of the threshold, the virtual triangle created by the three reference points m is determined to be a valid triangle (step S604). The virtual triangle in step S602 is created to be in contact with a vertex of a triangle, the distance of the centroid point o2 of which to the centroid point o1 is within the range of the threshold.

Next, the virtual plane creation unit 32 creates a virtual plane based on the virtual triangle which is determined in the pre-processing to be a valid triangle (step S605). The virtual plane determination unit 33 converts the height information acquired in step S601 into the height of the terminal 511, . . . , 518 that takes the virtual plane created in step S605 as a reference (step S606). Then, the terminal height after conversion and the height of a valid plane are compared against each other. The virtual plane determination unit 33 further determines a virtual plane including a terminal, the reference point m of which is higher than the virtual plane (i.e., the height information in FIG. 5A, 5B is +), to be an invalid plane. Moreover, the virtual plane determination unit 33 determines a virtual plane where no terminal with the reference point m higher than the virtual plane exists, to be a valid plane (step S607).

Next, the flatness detection unit 34 calculates the heights of the terminals 511, . . . , 518 by taking the valid plane as a reference, and takes statistics (step S608). The good/poor determination unit 36 determines an electronic component 5 for which there is a terminal, the height of which exceeds an allowable range, to be a defective product (NG), and determines an electronic component 5 for which the heights of all the terminals 511, . . . , 518 are within the allowable range to be a non-defective product. The good/poor determination unit 36 outputs the determination result indicating that an electronic component 5 is a non-defective product or a defective product to the output device 4 shown in FIG. 2, and causes the determination result to be displayed (step S609).

Additionally, in step S608, in the case where a plurality of virtual planes are determined to be valid planes, the flatness detection unit 34 calculates flatness of the component by taking each of the plurality of valid planes as a reference, and takes statistics. If a plurality of virtual planes are determined to be valid planes in step S607 of determining whether a virtual plane is a valid plane or not, flatness of the electronic component 5 is calculated in the following step S608 of determining good/poor, by taking each of the plurality of valid planes as a reference, statistics are taken, and a non-defective product or a defective product is determined.

Figure 7:
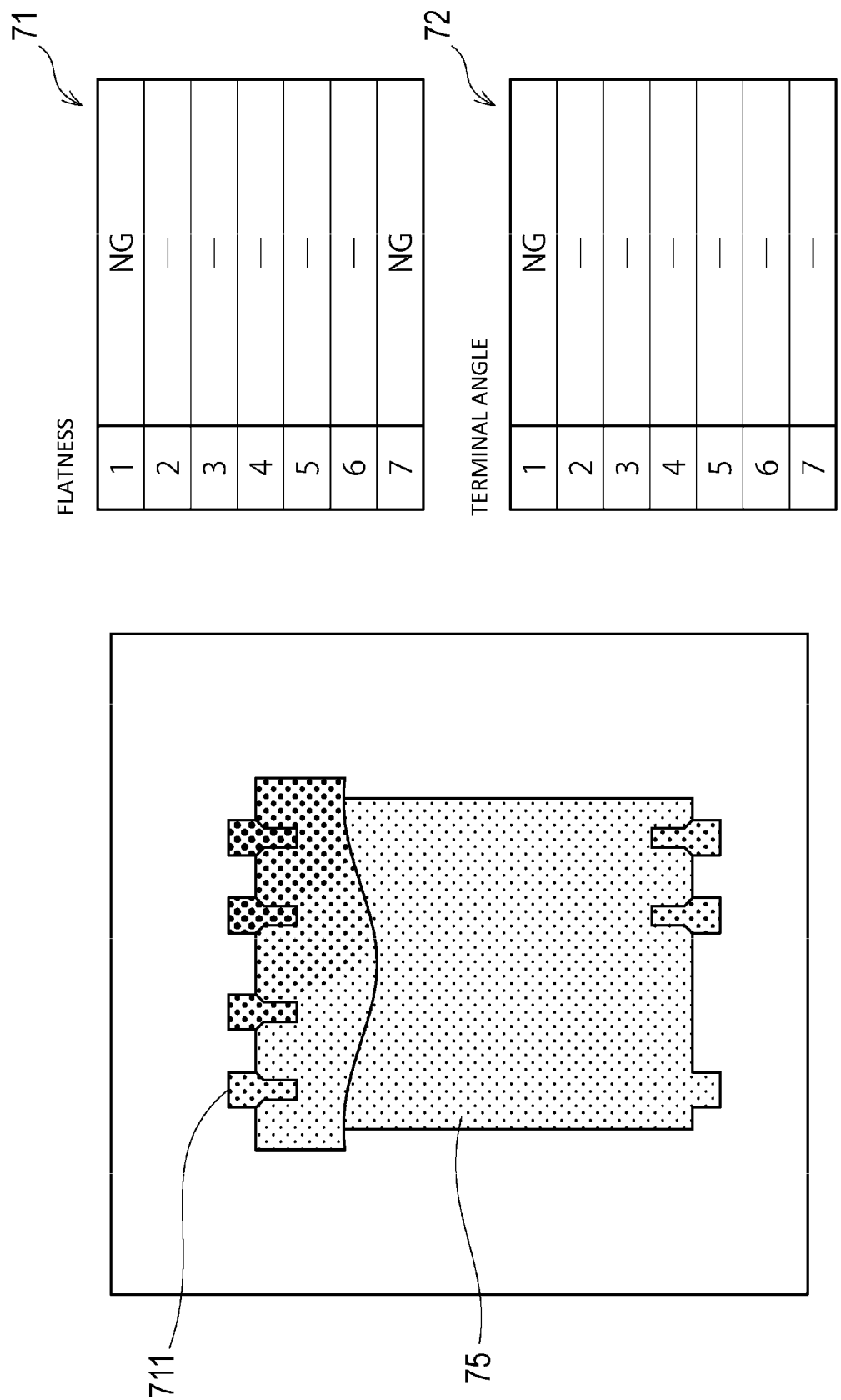
FIG. 7 is a diagram illustrating results that are output to an output device shown in FIG. 2.

FIG. 7 is a diagram illustrating results that are output to the output device 4, and shows an image 7 that is displayed on a display screen, not shown, of the output device 4, or that is output being printed on a sheet of paper or the like. The image 7 is a color image showing, in color, a height of an upper surface of an electronic component 75 including seven terminals 711. In the first embodiment, also in the example shown by the image 7, the electronic component 75 is inspected by measuring heights of reference points m of the terminals 711 by taking a valid plane as a reference. In the first embodiment, images 71, 72 are also displayed on the display screen of the output device 4, together with the image 7. The image 71 shows the plurality of terminals 711 that are specified by identification numbers 1, . . . , 7, and an inspection result of the height of each terminal. In the inspection result shown by the image 71, "NG" is determined for a terminal, the height of which from the valid plane is not within the allowable range. A sign "−" is shown for terminals, the heights of which are within the allowable range.

If NG is determined for any of the plurality of terminals, as shown in FIG. 7, the electronic component 5 is determined to be a defective product.

The image 72 shows the plurality of terminals 711 that are specified by the identification numbers 1, . . . , 7, and an inspection result for an angle of each terminal. In the inspection result shown by the image 72, "NG" is determined for a terminal, the angle of which with respect to the valid plane is not within an allowable range. A sign "−" is shown for terminals, the angles of which are within the allowable range. A measurement method for the angle of a terminal will be described in a second embodiment.

In the first embodiment, a description is given assuming that detection of flatness of the electronic component 5 including terminals is performed in an order of creation of a virtual triangle, determination of a valid triangle or an invalid triangle, creation of a virtual plane, detection of a terminal height, determination of a valid plane or an invalid plane, statistical processing (detection) on flatness, and determination of a non-defective product or a defective product. However, the first embodiment is not limited to such an order, and the steps described above may be performed in a different order. For example, creation of a virtual plane based on three reference points m (triangle), statistical processing regarding heights of the reference points m of all the terminals from such virtual planes, determination of a valid plane, determination of degrees of offset of a center and a centroid of the triangle on the valid plane, statistical processing with respect to flatness using the heights of the terminals on the valid plane including a valid triangle, and determination of a non-defective product or a defective product may be performed in such an order.

Second Embodiment

Next, a second embodiment of the present invention will be described. Like the first embodiment, the second embodiment is applied to a case where the component is the electronic component 5, and the reference point is the terminal of the electronic component. In the reference point information acquisition step, a plurality of pieces of position information and height information are acquired, taking a plurality of points on the terminal 511, . . . , 518 of the electronic component 5 as the reference points. A flatness detection method of the second embodiment further includes a terminal tilt detection step of taking, as a terminal height, height information that takes a valid plane as a reference, and of detecting a tilt of the terminal 511, . . . , 518 with respect to the valid plane by using the terminal height.

Figure 8A:
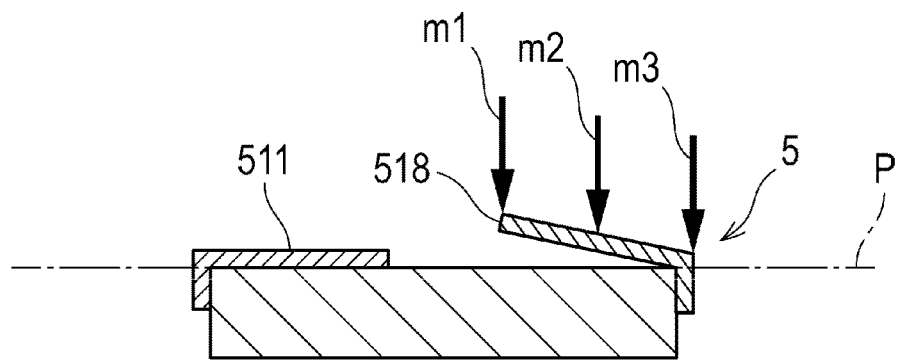
FIG. 8A is a diagram for describing a step for determining a terminal angle, according to a second embodiment of the present invention.
Figure 8B:
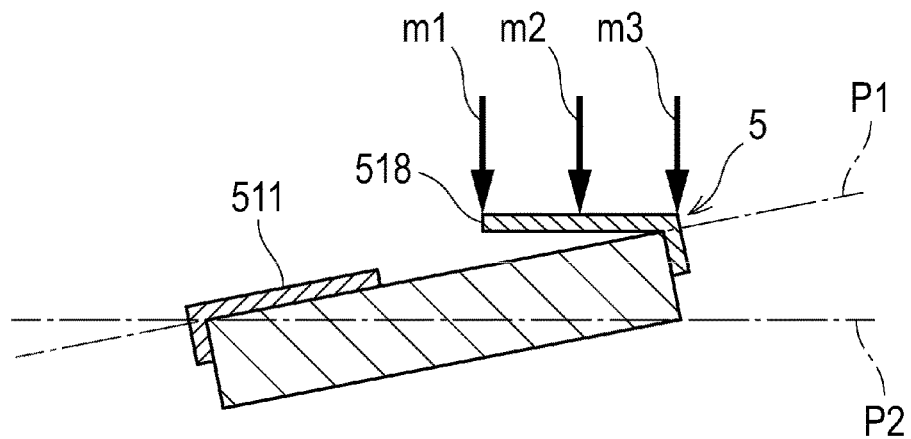
FIG. 8B is a diagram for describing a step for determining a terminal angle, according to the second embodiment of the present invention.
Figure 8C:
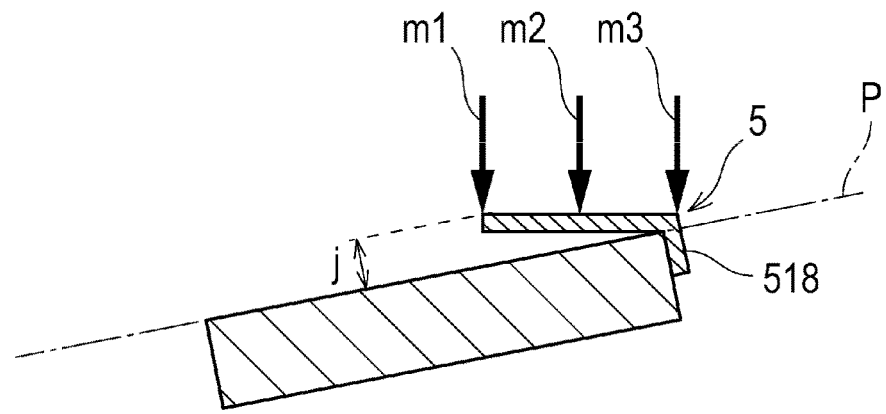
FIG. 8C is a diagram for describing a step for determining a terminal angle, according to the second embodiment of the present invention.

FIGS. 8A, 8B, and 8C are diagrams for describing such a step of the second embodiment for determining a tilt of a terminal. FIG. 8A shows an example where a valid plane P of the electronic component 5 is substantially horizontal. In the second embodiment, the 3D camera 2 radiates strip-shaped light m1, m2, m3 on three positions of each of the terminals 511, . . . , 518 (in FIG. 8A, the terminal 518) from above the electronic component 5. Then, an image that is formed by reflected light of the light m1, m2, m3 is captured, and is input as captured data to the flatness detection device 3. The flatness detection device 3 calculates heights of the three positions of the terminal 518 based on the captured data, and determines a tilt of the terminal 518.

In the processing described above, if a valid plane P1 is tilted with respect to a horizontal plane P2, as shown in FIG. 8B, when the heights of the three positions of the terminal 518 are measured in the same manner as in FIG. 8A, the tilt of the terminal 518 cannot be accurately measured due to the measured heights being affected by the tilt of the valid plane P1. Accordingly, in the second embodiment, by measuring the heights of the terminal 518 by taking the valid plane P as a reference, as shown in FIG. 8C, the angle of the terminal 518 may be accurately detected regardless of the tilt of the valid plane P.

In the terminal tilt detection step in the second embodiment, a virtual plane is created by the virtual plane creation unit 32 of the flatness detection device 3 shown in FIG. 2, and whether the virtual plane is a valid plane or an invalid plane is determined by the virtual plane determination unit 33. The flatness detection unit 34 converts distances h, which are pieces of height information acquired for a plurality of positions (reference points) of the terminal 518, into lengths from a valid virtual plane to the reference points of the terminal 518 (hereinafter referred to as "terminal height(s)"). Then, for example, as shown in FIG. 8C, the tilt of the terminal 518 is detected by calculating a distance j to an end portion of the terminal 518 by taking the valid plane P as a reference. Such a tilt is obtained based on the terminal height from the valid plane, and does not include a tilt of the electronic component 5. Accordingly, in the second embodiment, the tilt of a terminal may be accurately detected regardless of variations in the terminal heights due to the tilt of the electronic component 5 and the like.

In the second embodiment, heights of two end portions (base and tip of the terminal), in a top view of the terminal 518, from the valid plane P may be detected, and a tilt between the two end portions may be determined, for example. This is because terminal end portions are easily detectable in image data, and a height difference may be easily determined.

Additionally, the second embodiment is not limited to the configuration described above. For example, the second embodiment is not limited to measuring the heights at three positions of one terminal, and heights of both ends of a terminal in a top view of the electronic component 5 may be measured instead, for example.

Moreover, in the second embodiment, the heights of both ends of the terminal 511, . . . , 518 in a top view may be measured, and thus, the state of the terminal 511, . . . , 518 with respect to the electronic component 5 may be observed in greater detail. Furthermore, if the processing of the second embodiment is performed in conjunction with that of the first embodiment, data may be shared between the two modes of processing, and the efficiency of inspection of the electronic component 5 may be further increased.

In both the first and second embodiments described above, a valid plane which may be reliably used as a reference for measurement is selected from a plurality of virtual planes, and the height of a terminal is measured by taking the valid plane as a reference. Accordingly, in the first and second embodiments, the terminal height may be accurately measured regardless of a tilt of the electronic component 5, and reliability of inspection of the electronic component may be increased. Furthermore, in the first and second embodiments, because the terminal height may be measured by capturing the electronic component 5 from above, a measurement time is short, and thus, the first and second embodiments are suitable for performing inspection of every electronic component.

In the first and second embodiments described above, the electronic component 5 is not captured through glass as in Patent Document 2, and thus, measurement is not affected by scratches, impurities, transmittance and the like of glass. Furthermore, the first and second embodiments do not require a structure for removing noises in signals which are due to glass, and are thus advantageous in simplifying and miniaturizing the device.

The above-described embodiments and examples contain the following technical ideas.

(1) A flatness detection method of detecting flatness of a component based on captured data obtained by capturing the component by a capturing device, the flatness detection method including: a reference point information acquisition step of acquiring position information and height information of a plurality of reference points of the component; a virtual plane creation step of creating a virtual plane based on the position information and the height information of at least three selected points selected from the plurality of reference points; a virtual plane determination step of determining, based on the height information that takes, as a reference, the virtual plane of the reference points excluding the selected points, whether the virtual plane is a valid plane or an invalid plane; and a flatness detection step of detecting flatness of the component by taking the valid plane as a reference.

(2) The flatness detection method according to (1), where the virtual plane creation step includes a pre-processing step that is performed before creation of the virtual plane, and in the pre-processing step, whether to create the virtual plane in the virtual plane creation step or not is determined, based on a distance between a specified point that is specified by at least one of the position information or the height information, and a design point that is specified in designing of the component.

(3) The flatness detection method according to (1) or (2), where, in the virtual plane determination step, the height information is acquired for the plurality of reference points by taking one virtual plane as a reference, and the virtual plane is determined to be an invalid plane in a case where there is height information, among pieces of the height information, indicating that the reference point is further away from the component than the virtual plane, and at least a part of the virtual plane not determined to be the invalid plane is determined to be the valid plane.

(4) The flatness detection method according to (3), where, in the virtual plane determination step, the height information that is acquired in the reference point information acquisition step is converted into a height from the virtual plane to the reference point.

(5) The flatness detection method according to any one of (1) to (4), where, in the flatness detection step, in a case where a plurality of virtual planes are determined to be the valid planes in the virtual plane determination step, flatness of the component is detected by taking each of the plurality of valid planes as a reference.

(6) The flatness detection method according to any one of (1) to (5), where the component is an electronic component including a terminal, a plurality of pieces of the position information and the height information are acquired in the reference point information acquisition step, by taking a plurality of points on the terminal of the electronic component as the reference points, and the flatness detection method further includes a terminal tilt detection step of converting the height information that takes the valid plane as a reference into terminal height information about the terminal, and of detecting a tilt of the terminal with respect to the electronic component based on the terminal height information.

(7) A flatness detection device for detecting flatness of a component based on captured data obtained by capturing the component by a capturing device, the flatness detection device including: a reference point information acquisition unit for acquiring position information and height information of a plurality of reference points of the component; a virtual plane creation unit for creating a virtual plane based on the position information and the height information of at least three selected points selected from the plurality of reference points; a virtual plane determination unit for determining, based on the height information that takes, as a reference, the virtual plane of the reference points excluding the selected points, whether the virtual plane is a valid plane or an invalid plane; and a flatness detection unit for detecting flatness of the component by taking the valid plane as a reference.

(8) A non-transitory computer-readable storage medium storing a flatness detection program for detecting flatness of a component based on captured data obtained by capturing the component by a capturing device, the program being for causing a computer to perform: a reference point information acquisition function for acquiring position information and height information of a plurality of reference points of the component; a virtual plane creation function for creating a virtual plane based on the position information and the height information of at least three selected points selected from the plurality of reference points; a virtual plane determination function for determining, based on the height information that takes, as a reference, the virtual plane of the reference points excluding the selected points, whether the virtual plane is a valid plane or an invalid plane; and a flatness detection function for detecting flatness of the component by taking the valid plane as a reference.

This application claims priority to Japanese Patent Application No. 2018-092100 filed May 11, 2018 which is hereby expressly incorporated by reference herein in its entirety.

What is claimed is:

1. A flatness detection method of detecting flatness of a component based on captured data obtained by capturing the component by a capturing device, the flatness detection method comprising:
   a reference point information acquisition step of acquiring position information and height information of a plurality of reference points of the component;
   a virtual plane creation step of creating a virtual plane based on the position information and the height information of at least three selected points selected from the plurality of reference points;
   a virtual plane determination step of determining, based on the height information that takes, as a reference, the virtual plane of the reference points excluding the selected points, whether the virtual plane is a valid plane or an invalid plane; and
   a flatness detection step of detecting flatness of the component by taking the valid plane as a reference.

2. The flatness detection method according to claim 1, wherein
the virtual plane creation step includes a pre-processing step that is performed before creation of the virtual plane, and
in the pre-processing step, whether to create the virtual plane in the virtual plane creation step or not is determined, based on a distance between a specified point that is specified by at least one of the position information or the height information, and a design point that is specified in designing of the component.

3. The flatness detection method according to claim 1, wherein, in the virtual plane determination step, the height information is acquired for the plurality of reference points by taking one virtual plane as a reference, and the virtual plane is determined to be an invalid plane in a case where there is height information, among pieces of the height information, indicating that the reference point is further away from the component than the virtual plane, and at least a part of the virtual plane not determined to be the invalid plane is determined to be the valid plane.

4. The flatness detection method according to claim 3, wherein, in the virtual plane determination step, the height information that is acquired in the reference point information acquisition step is converted into a height from the virtual plane to the reference point.

5. The flatness detection method according to claim 1, wherein, in the flatness detection step, in a case where a plurality of virtual planes are determined to be the valid planes in the virtual plane determination step, flatness of the component is detected by taking each of the plurality of valid planes as a reference.

6. The flatness detection method according to claim 1, wherein
the component is an electronic component including a terminal,
a plurality of pieces of the position information and the height information are acquired in the reference point information acquisition step, by taking a plurality of points on the terminal of the electronic component as the reference points, and
the flatness detection method further comprises a terminal tilt detection step of converting the height information that takes the valid plane as a reference into terminal height information about the terminal, and of detecting a tilt of the terminal with respect to the electronic component based on the terminal height information.

7. A flatness detection device for detecting flatness of a component based on captured data obtained by capturing the component by a capturing device, the flatness detection device comprising:
a reference point information acquisition unit for acquiring position information and height information of a plurality of reference points of the component;
a virtual plane creation unit for creating a virtual plane based on the position information and the height information of at least three selected points selected from the plurality of reference points;
a virtual plane determination unit for determining, based on the height information that takes, as a reference, the virtual plane of the reference points excluding the selected points, whether the virtual plane is a valid plane or an invalid plane; and
a flatness detection unit for detecting flatness of the component by taking the valid plane as a reference.

8. A non-transitory computer-readable storage medium storing a flatness detection program for detecting flatness of a component based on captured data obtained by capturing the component by a capturing device, the program being for causing a computer to perform:
a reference point information acquisition function for acquiring position information and height information of a plurality of reference points of the component;
a virtual plane creation function for creating a virtual plane based on the position information and the height information of at least three selected points selected from the plurality of reference points;
a virtual plane determination function for determining, based on the height information that takes, as a reference, the virtual plane of the reference points excluding the selected points, whether the virtual plane is a valid plane or an invalid plane; and
a flatness detection function for detecting flatness of the component by taking the valid plane as a reference.

* * * * *